(12) United States Patent
Wellens et al.

(10) Patent No.: US 11,973,330 B1
(45) Date of Patent: Apr. 30, 2024

(54) CABLE TRUNKING

(71) Applicant: Trojan IP Limited, Hove (GB)

(72) Inventors: Stewart Wellens, Hove (GB); Philip Forrest-Smith, Nottingham (GB)

(73) Assignee: TROJAN IP LIMITED, Hove (GB)

( * ) Notice: Subject to any disclaimer, the term of this patent is extended or adjusted under 35 U.S.C. 154(b) by 0 days.

(21) Appl. No.: 18/145,892

(22) Filed: Dec. 23, 2022

(51) Int. Cl.
*H02G 3/04* (2006.01)
*H02G 3/06* (2006.01)

(52) U.S. Cl.
CPC ......... *H02G 3/0437* (2013.01); *H02G 3/0418* (2013.01); *H02G 3/0608* (2013.01)

(58) Field of Classification Search
None
See application file for complete search history.

(56) References Cited

U.S. PATENT DOCUMENTS

| | | | | |
|---|---|---|---|---|
| 3,844,078 A * | 10/1974 | Jensen | ................... | H02G 3/105 |
| | | | | 52/220.1 |
| 4,710,853 A * | 12/1987 | Reinhardt | ............ | H05K 7/1425 |
| | | | | 220/4.26 |
| 5,597,980 A * | 1/1997 | Weber | .................. | H02G 3/0418 |
| | | | | 174/72 A |
| 5,709,249 A * | 1/1998 | Okada | .................. | H02G 3/0418 |
| | | | | 174/101 |
| 5,942,729 A * | 8/1999 | Carlson, Jr. | .......... | H02G 3/0418 |
| | | | | 174/66 |
| 6,333,461 B1 * | 12/2001 | Marcou | ................ | H02G 3/0418 |
| | | | | 174/68.3 |
| 6,437,244 B1 * | 8/2002 | Vander Velde | ...... | H02G 3/0418 |
| | | | | 174/101 |
| 6,476,327 B1 * | 11/2002 | Bernard | ................. | H02G 3/045 |
| | | | | 174/101 |
| 6,667,876 B1 * | 12/2003 | Neeff | ..................... | H02G 3/105 |
| | | | | 361/601 |
| 6,810,191 B2 * | 10/2004 | Ferris | ................... | H02G 3/0418 |
| | | | | 248/68.1 |
| 6,861,589 B2 * | 3/2005 | Katsumata | .......... | E05D 11/0081 |
| | | | | 174/101 |
| 7,673,835 B2 * | 3/2010 | Lindquist | ............. | H02G 3/0418 |
| | | | | 174/209 |
| 7,952,027 B2 * | 5/2011 | Grelck | ................. | H05K 7/1491 |
| | | | | 174/101 |
| 8,217,266 B2 * | 7/2012 | Caveney | ................ | H02G 3/105 |
| | | | | 174/72 A |
| 8,757,673 B2 * | 6/2014 | Davis | ................... | H02G 3/0418 |
| | | | | 174/67 |
| 10,862,283 B1 * | 12/2020 | Hansen | ................ | H02G 3/0437 |
| 10,958,049 B2 * | 3/2021 | Strong | ..................... | H02G 3/24 |
| 2016/0087415 A1 * | 3/2016 | Stolp | .................... | H02G 3/0418 |
| | | | | 174/97 |
| 2016/0105009 A1 * | 4/2016 | Borer | ....................... | H02G 3/04 |
| | | | | 385/136 |

* cited by examiner

*Primary Examiner* — Krystal Robinson
(74) *Attorney, Agent, or Firm* — Hoffman Warnick LLC

(57) ABSTRACT

The invention includes a trunking section for accommodating a cable or other service, the trunking section comprising a base unit and a lid, whereby: in a first configuration, the lid is arranged to reside atop the base unit such that an interior of the base unit is substantially covered; and in a second configuration, the lid is arranged to be coupled and in close proximity to the base unit, such that access to the interior of the base unit is substantially unimpeded.

5 Claims, 5 Drawing Sheets

CABLE TRUNKING

The present invention relates to trunking or conduit for accommodating cables and/or other services. It relates particularly, but not exclusively to conduit or trunking arranged for use alongside a railway track. Throughout this application, the term trunking will be used to mean a device or apparatus having the properties of accommodating cables and/or other services, with a view to containing them and keeping them relatively secure.

It is known to provide trunking alongside railway tracks to accommodate power, signalling or telecom cables. In the prior art, trunking formed from concrete sections is known. The use of concrete introduces a great many problems ranging from installation, environmental and sustainability problems. The present applicant has several applications or patents in relation to improvements in this field.

A particular problem is encountered when installing new trunking alongside a railway track. This problem relates to ensuring that a trunking section and associated lid are properly associated, so that stray lids are not simply distributed randomly at the installation site. This is because it can then prove difficult to ensure that there are sufficient lids provided. Further, they can be left, inappropriately, between the rails of the track or in otherwise inconvenient or dangerous locations.

It is an aim of embodiments of the present invention to address issues with the prior art, whether mentioned herein or not. At least, the present invention aims to provide an alternative solution to those offered in the prior art.

According to the present invention, there is provided a trunking section for accommodating a cable or other service, the trunking section comprising a base unit and a lid, whereby: in a first configuration, the lid is arranged to reside atop the base unit such that an interior of the base unit is substantially covered; and in a second configuration, the lid is arranged to be coupled and in close proximity to the base unit, such that access to the interior of the base unit is substantially unimpeded.

In an embodiment, in the second configuration, the lid is arranged substantially at 90° to its position in the first configuration.

In an embodiment, the lid, in the second configuration, is located substantially outside the base unit.

4. In an embodiment, the lid and base unit are each provided with a complementary, inter-engaging, feature.

In an embodiment, the lid is provided with a projection and the base unit is provided with an aperture arranged to receive the projection.

In an embodiment, the projection has a substantially T-shaped cross-section, whereby an upright portion of the T-shape is arranged to be accommodated in the aperture.

In an embodiment, a plurality of complementary inter-engaging features are provided, such that the lid can adopt the second configuration on two different sides of the base unit.

In an embodiment, the aperture is provided in a relatively weakened portion of the base unit, the relatively weakened portion being arranged for removal such that access to an interior of the base unit is facilitated.

According to the present invention there is provided an apparatus and method as set forth in the appended claims. Other features of the invention will be apparent from the dependent claims, and the description which follows.

Although a few preferred embodiments of the present invention have been shown and described, it will be appreciated by those skilled in the art that various changes and modifications might be made without departing from the scope of the invention, as defined in the appended claims.

For a better understanding of the invention, and to show how embodiments of the same may be carried into effect, reference will now be made, by way of example only, to the accompanying diagrammatic drawings in which.

Figure 1:
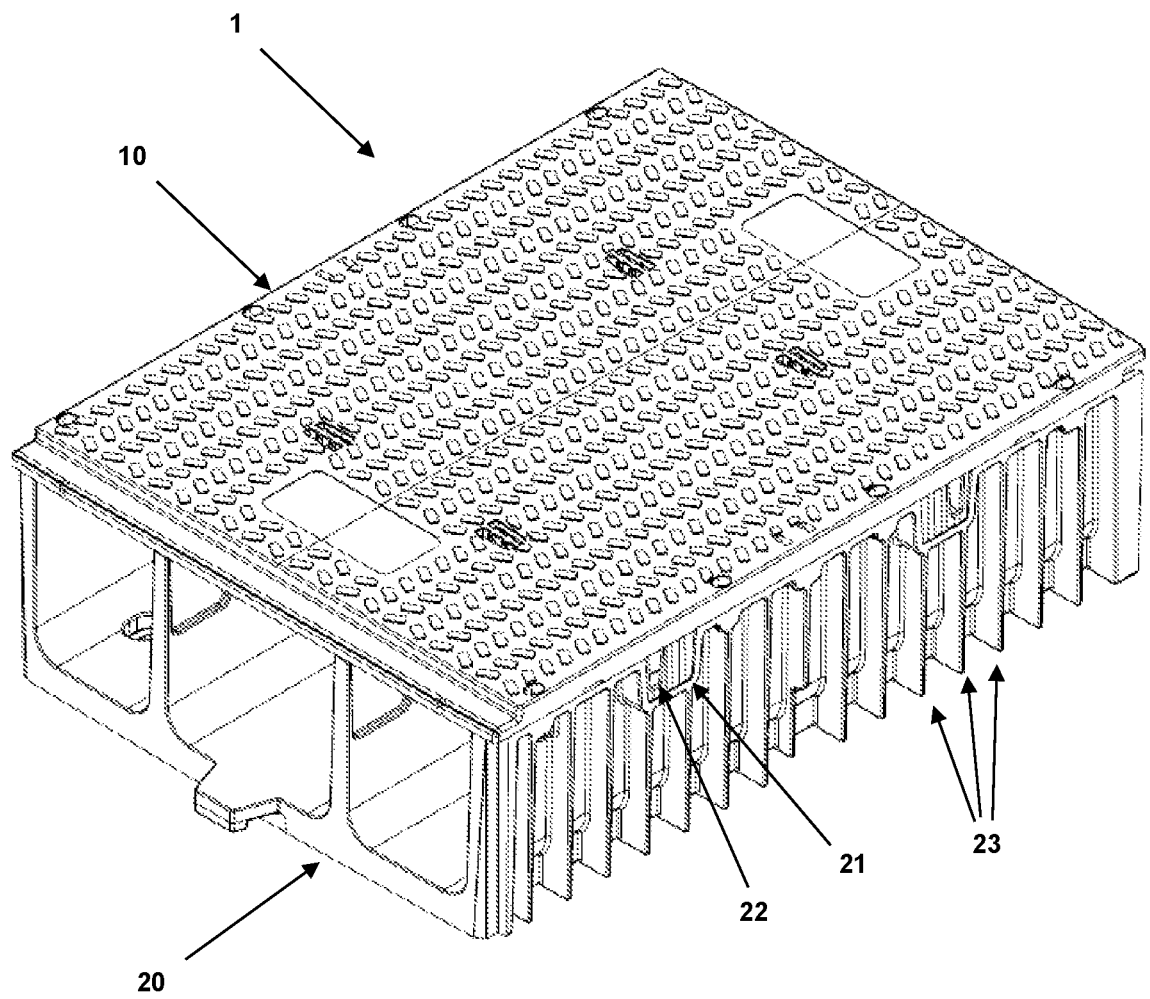
FIG. 1 shows an upper perspective view of a trunking section with a lid in the in-use, fitted, position, according to an embodiment of the present invention.
Figure 2:
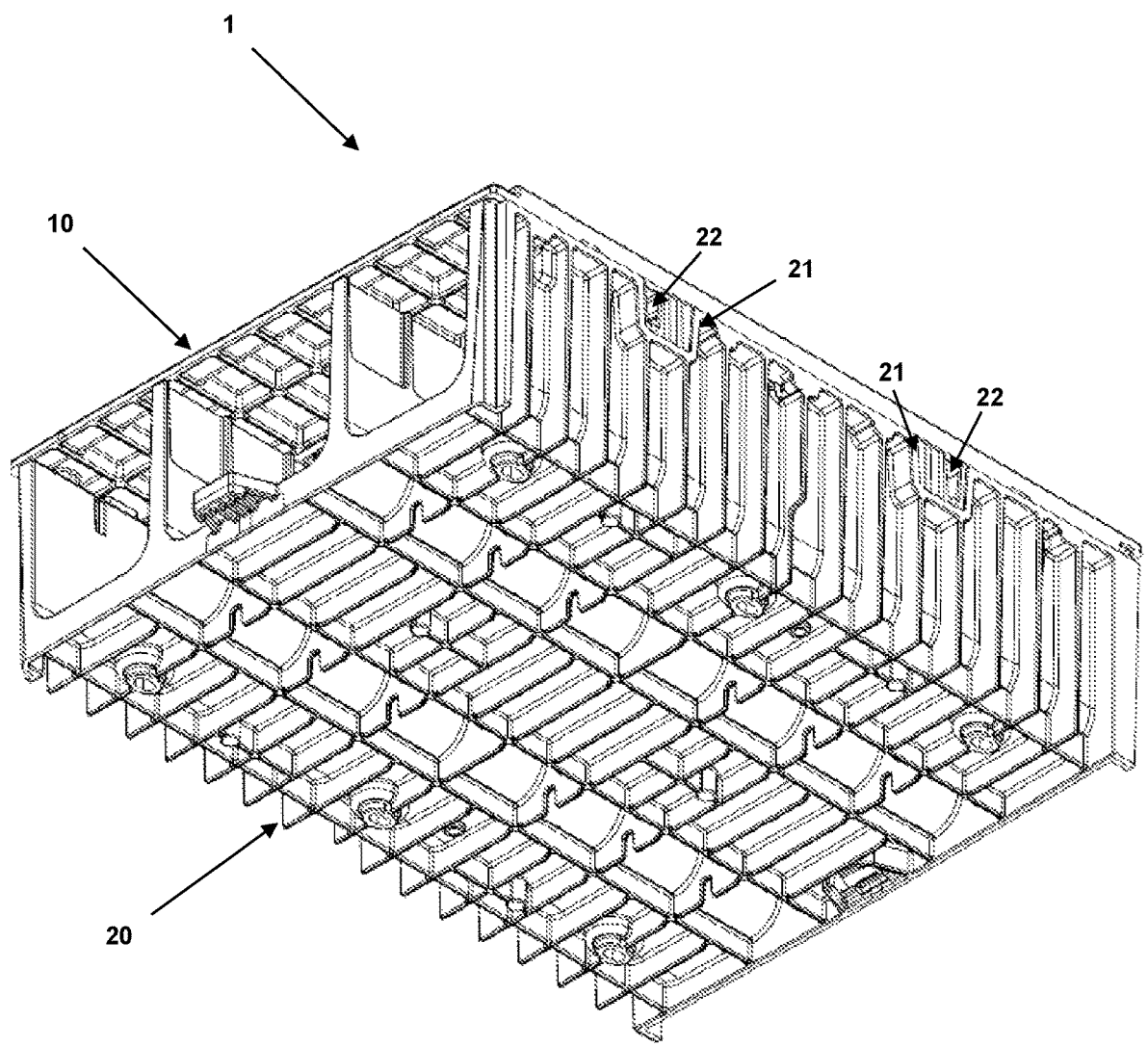
FIG. 2 shows a lower perspective view of a trunking section according to an embodiment of the present invention.
Figure 3:
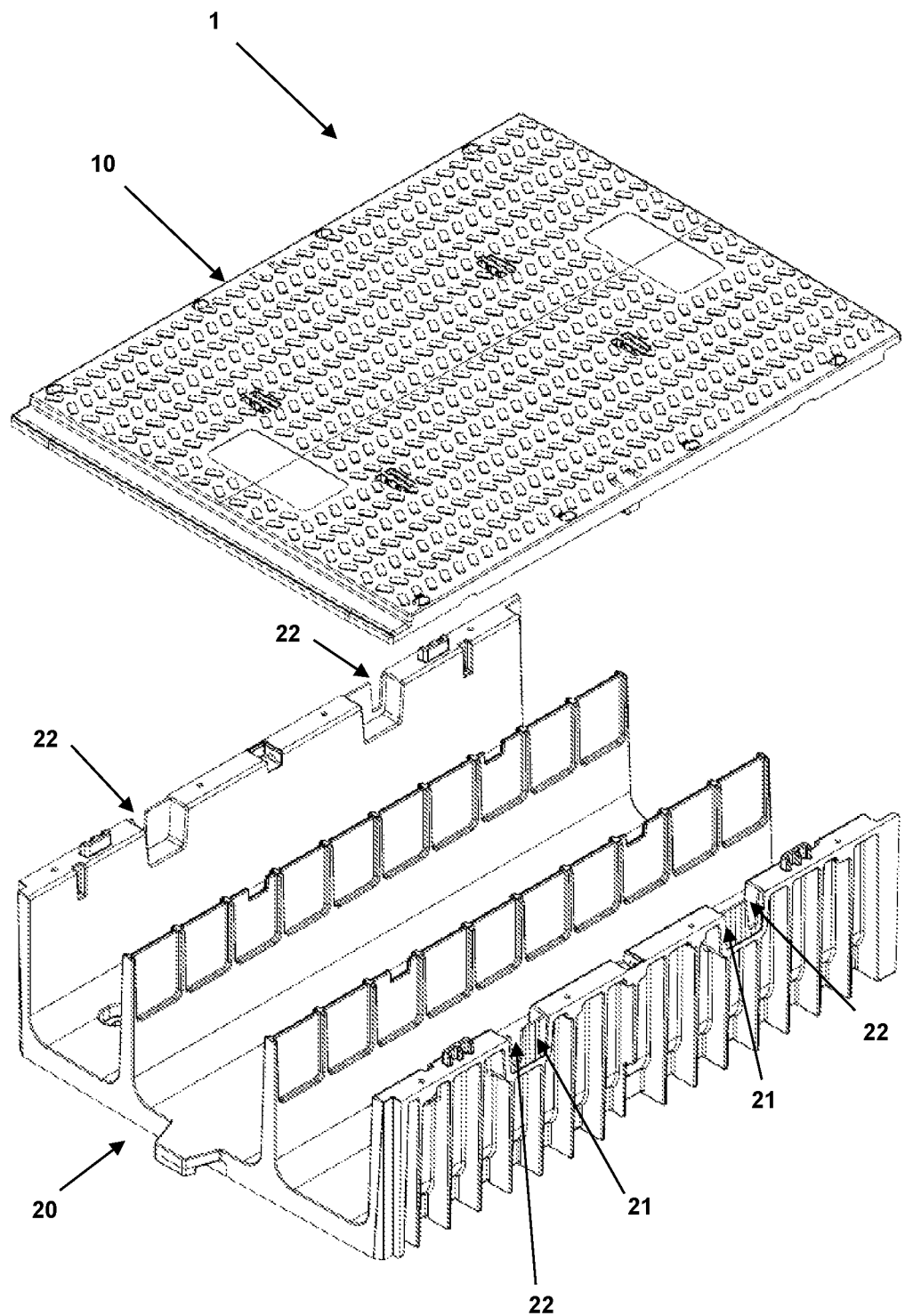
FIG. 3 shows an exploded perspective view of a trunking section according to an embodiment of the present invention.

FIGS. 1 to 3 show a trunking section 1 which comprises a base unit 20 and lid 10. The base unit 20 is configured to be at least partially submerged in earth or material trackside. Ribs 23 are provided in order to provide better engagement with the earth or material. The trunking section 1 is moulded from a plastics material, preferably a recycled plastics material.

The base unit 20 is subdivided in the embodiment shown to include three discrete channels, each provided to accommodate a particular type of cable or service. For instance, a first channel may comprise power cables, a second may comprise, signalling cables and the third may include telecom cables, perhaps leased by a telecom company. Other embodiments may be provided with more or fewer channels as required.

Each base unit 20 is arranged to couple with a neighbouring base unit so as to form a continuous run of units 1. The coupling can be configured as required so that little or no movement is possible between adjacent units 1.

When installing the units 1, it is typically necessary to install the base units 20 alongside the track and then install the cables or services before the lids 10 can be fitted and secured. The lid 10 may be secured by means of screws, nuts, bolts, rivets, pins, snap-fit connectors or any other form of connector. The connector used may be permanently fitted or may facilitate removal, possibly by means of a suitable tool.

There is typically a delay between installing the base units and the time when the cables or services are installed. During this time, it is important to ensure that sufficient lids 10 are available to be fitted to complete the installation. It is desirable to ensure that lids are provided in a convenient location for later fitting, rather than merely depositing a pallet of lids at one point. It is not convenient to fit the lids before the cables or services are installed, since they will require removal and then re-fitting after the cables or services are installed. Merely placing the lids alongside the base units is not desirable, since they can get damaged, misplaced or blown away by passing trains, if the track is operating.

Figure 4:
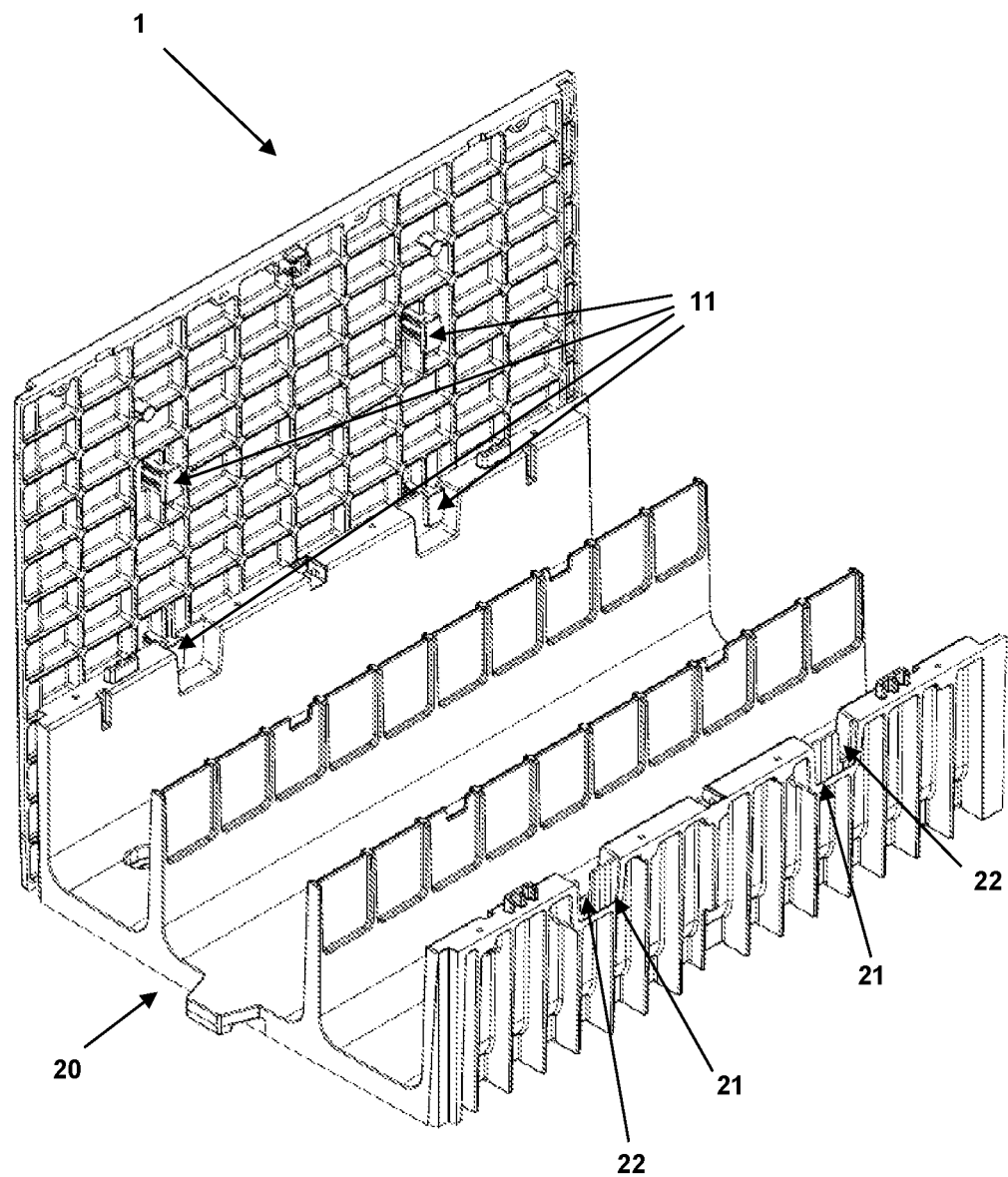
FIG. 4 shows a perspective view of a trunking section with the lid in a stowed position according to an embodiment of the present invention.

In order to provide a means to ensure the availability and security of the lids before they are fitted, the lid 10 and base unit 20 is arranged to provide cooperating portions so that the lid 10 and be temporarily stowed in a coupled position to an associated base unit 20. This is shown in FIG. 4, where the lid 10 is in a stowed position, whereby the lid is maintained in close proximity to its associated base unit until such time as the lid is fitted to the base unit in the configuration shown in FIG. 1. As shown in FIG. 4, the lid 10 is arranged to be substantially at 90° to its position in the configuration shown in FIG. 1

To facilitate the temporary stowage, an underside of the lid 10 is provided with one or more projections 11 which are arranged to engage with complementary slots 22 provided in the side walls of the base unit 20. More particularly, in the embodiment shown, a relatively weakened portion 22 is provided and the slot 21 is provided therein. The purpose of the relatively weakened portion is to allow the portion 22 to be knocked out with a hammer or similar, to facilitate access to the interior of the base unit 20 so that a cable or other service can enter or exit the base unit, sideways, as required. This may be to make a connection to a signal or other trackside device. The relatively weakened portion is simply arranged not to span the entire aperture into which it is formed, so that the projection 11 can be slid into the slot thereby created, thereby retaining the lid 10 in the temporary stowed position shown in FIG. 4.

The projection 11 is arranged to have a substantially T-shaped cross section so that the upright part of the T-shape resides in the slot and the horizontal part of the T serves to retain the lid in situ. Other shapes and configurations are possible for both the projection 11 and slot 22, with the T-shaped projection and simple slot shown here being exemplary only. The cooperation between the lid 10 and base unit 20 typically requires the lid to be retained in or alongside the base unit so that easy access is provided to the interior of the base unit unit such time as the lid 10 is finally positioned atop the base unit as shown in FIG. 1.

Figure 5A:
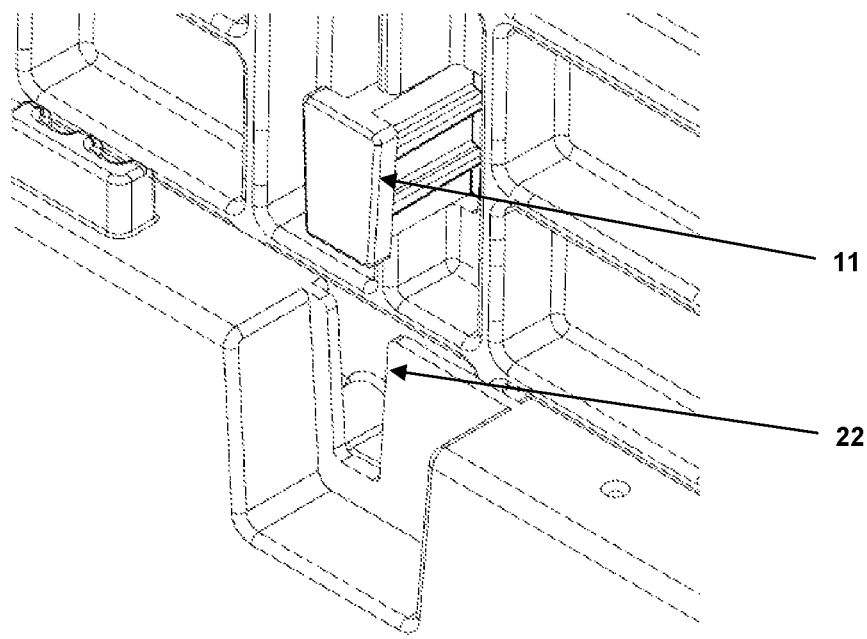
FIGS. 5a and 5b show a detailed view of a lid stowage arrangement according to an embodiment of the present invention.
Figure 5B:
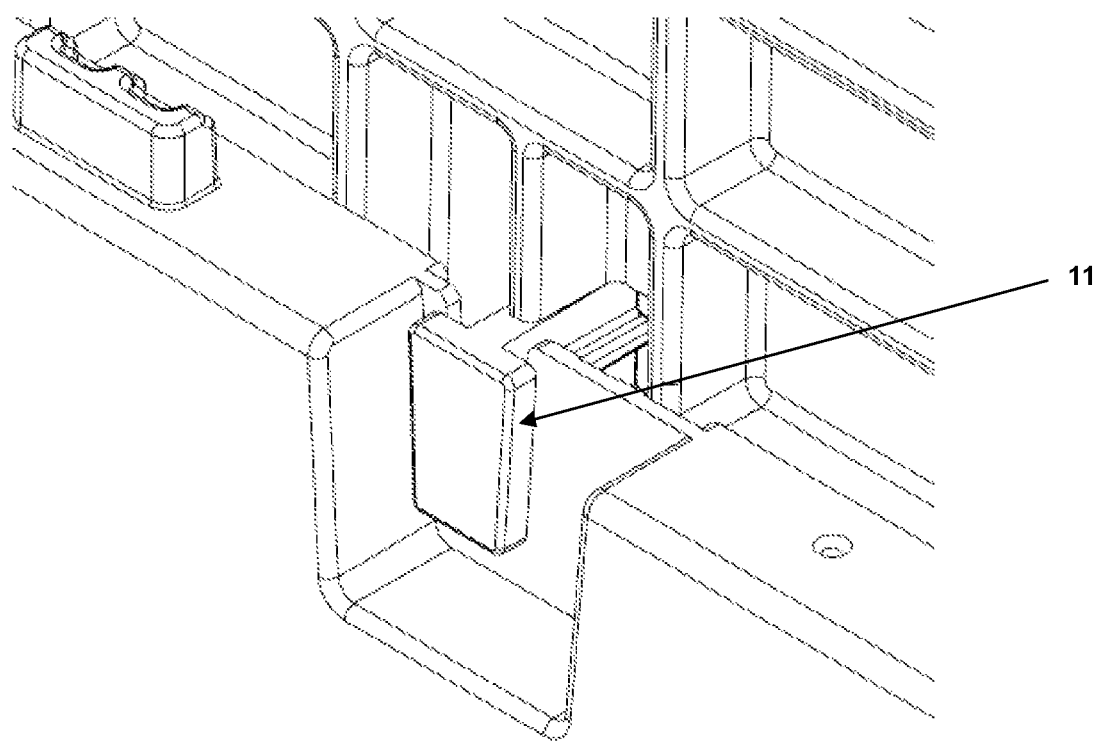

The particular mode of operation in this embodiment is shown in more detail in FIGS. 5a and 5b. FIG. 5a shows the projection 11 as it is introduced into the slot 22. FIG. 5b shows the projection 11 fully inserted into the slot 22.

As shown in FIG. 3, a pair of slots 22 is provided on each side of the base unit 20. This ensures that the lid may be stowed on either side of the base unit to take account of obstructions which may impede access to one of the sides of the trough. For instance, the lid may be stowed away from the rail track or, if that side is obscured in some way, the lid may be stowed on the side nearest the rail track.

In a similar manner, the projections 11 are provided in two pairs, each located on either side of a centre line of the lid. This can be seen in FIG. 4. With the lid in the position shown, the lower pair of projections 11 may engage with the slots 22, as shown, ensuring that the lid is maintained in a position whereby access to the interior of the base unit is possible, while also ensuring that the lid is kept in close proximity to the base unit for subsequent fixing into the configuration shown in FIG. 1.

By means of an embodiment of the present invention, installation of a plurality of trunking sections is simplified. In particular, it is possible to ensure that each base unit has an associated lid in close proximity and it is straightforward for an installer to see immediately if there are sufficient lids provided for the number of base units. Once stowed, the lids are kept more secure than if they were simply delivered to site and distributed alongside the track.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A trunking section for accommodating a cable or other service, the trunking section comprising a base unit and a lid, wherein the lid is provided with a projection and the base unit is provided with an aperture arranged to receive the projection, whereby:

in a first configuration, the lid is arranged to reside atop the base unit such that an interior of the base unit is substantially covered; and in a second configuration, the lid is arranged to be coupled and in close proximity to the base unit, such that access to the interior of the base unit is substantially unimpeded, wherein the aperture is provided in a relatively weakened portion of the base unit, the relatively weakened portion being arranged for removal such that access to an interior of the base unit is facilitated.

2. The trunking section of claim 1 wherein, in the second configuration, the lid is arranged substantially at 90° to its position in the first configuration.

3. The trunking section of claim 1 wherein the lid, in the second configuration, is located substantially outside the base unit.

4. The trunking section of claim 1 wherein the projection has a substantially T-shaped cross-section, whereby an upright portion of the T-shape is arranged to be accommodated in the aperture.

5. The trunking section of claim 1, wherein a plurality of complementary inter-engaging features are provided, such that the lid can adopt the second configuration on two different sides of the base unit.

* * * * *